Patented May 14, 1929.

1,712,555

UNITED STATES PATENT OFFICE.

WILLIAM F. GEHRIG, OF BERKELEY HEIGHTS, NEW JERSEY, ASSIGNOR TO ESSEX SPECIALTY CO. INC., OF BERKELEY HEIGHTS, NEW JERSEY, A CORPORATION OF NEW JERSEY.

DETONATING FIREWORK COMPOSITION.

No Drawing.     Application filed December 7, 1927. Serial No. 238,467.

This invention relates to fireworks which are set in action by means of impact, or friction, or heat, and which during combustion thereof produce a succession of explosive detonations or reports; the action taking place in such manner that the article does not explode in mass but burns with a relatively slow combustion accompanied by rapid intermittent, small and harmless explosions.

Heretofore such form of fireworks have been made with poisonous yellow phosphorus, potassium chlorate and an organic binding material, such as shellac or gum.

In order to avoid the use of the poisonous yellow phosphorus, it has been proposed to employ sulphur phosphorus compounds and particularly sesquisulfide of phosphorus as the active agent with oxygen producing element in the form of potassium chlorate, the compound being bound in intimate mixture by a cementitious binder comprising magnesium chloride and magnesium oxide. It has been found, however, that such form of binder is not altogether satisfactory for the reason that the magnesium chloride ingredient thereof being very hygroscopic, the finished article is sensitive to climatic changes, tending to crumble and deteriorate especially in damp or humid weather.

It is the primary object of the instant invention to provide a composition which is not sensitive to moisture and which therefore will not readily deteriorate under changing climatic or weather conditions, but will remain firm and hard at all times so as to be properly operative when put to the use for which it is intended; and to this end I employ as the binder ingredients of the composition magnesium oxide with an alum or an isomorphous compound similar thereto, such e. g. as those in which the trivalent aluminum is replaced by trivalent iron, chromium, manganese, etc., choosing as the preferable form of the alum ingredient, chromium potassium sulphate, generally known as chrome alum. The binder formed by such ingredients owing to the hardening qualities of the chrome alum, when combined in the firework composition, is non-hygroscopic, and produces a hard inorganic cementitious material or carrier through which the phosphorus sesquisulphide and oxygen producing materials may be dispersed and retained in that closely incorporated relation necessary to effect the character of combustion producing the successive or intermittent small explosions or reports rather than relatively slow flaming combustion which it is desired to avoid.

In making up the novel firework composition of this invention, phosphorus sesquisulphide is introduced into a water mixture of potassium chlorate to which has been added a cementitious mixture consisting of magnesium oxide and chromium potassium sulphate. To this mixture may be added an inert filler, such as beach sand, whereupon the mixture is then formed into discs or other shapes or spread on a suitable surface and dried. The sulphur phosphorus compounds, as e. g. phosphorus sesquisulphide, is first transformed into crystals of appropriate size, i. e. fairly coarse grains, by recrystallization with carbon bisulphide or other suitable solvents. The potassium chlorate is preferably utilized in powdered form.

As an example of the composition of this invention, the ingredients are mixed together in the following proportions by weight:—

|  | Parts. |
|---|---|
| Potassium chlorate | 35 |
| Magnesium oxide | 35 |
| Chromium potassium sulphate | 10 |
| Sesquisulphide of phosphorus | 12 |
| Inert filler | 8 |

To the active ingredients may be added a filler, such as beach sand, of amount approximating by weight about 8 per cent of the total mass.

The preferred manner of preparing the composition is as follows:—

I dissolve 10 pounds of chromium potassium sulphate or chrome alum in water and then add thereto 35 pounds of potassium chlorate, and thereupon adding in the desired quantity of a filler such as beach sand to an amount of about 8 pounds. These ingredients are thoroughly intermixed and stirred into a thick paste. Into the resultant paste I then add 35 pounds of magnesium oxide, and stir in the same, and finally I add about 12 pounds of phosphorus sesquisulphide, mixing the same in very thoroughly to disperse the same throughout the mass. After the paste is thus produced I form discs or bodies thereof of desired size which are dried at moderate temperates of from 40 to 70 degrees centigrade; or the paste may be deposited on paper strips or sheets in the form of segregated spots or pellets; or the paste may be deposited on a fuse material; in any case when dried the same will provide a combustible composition which, when ignited will burn in such manner as to produce the desired series or rapid succession of detonations or explosions.

Magnesium oxide used alone as a binder in the above composition would not be satisfactory inasmuch as this material of itself does not assume the desired hardness upon drying. Also, owing to the capacity of magnesium oxide to slowly absorb water, the composition employing it alone would crumble and deteriorate especially in moist climates. The presence of the chrome alum in the composition along with the magnesium oxide renders the same hard and non-hygroscopic. During and after the drying process, the chrome alum evidently reacts with the magnesium oxide to form metallic oxy-sulphates which are of considerable hardness and are similar in characteristics to the metallic oxychlorides which are present in certain cements. These metallic oxy-sulphates render the composition hard and resistant to moisture and also aid in separating particles of phosphorus sesquisulphide so as to thereby restrain the burning of the material and obtain intermittent detonation.

The composition thus produced will, when dried, provide a relatively hard dense mass which is non-hygroscopic so that it keeps well under variations of climatic or weather conditions, and will remain properly operative for the purposes intended.

The composition of the kind described possesses, in addition to the keeping qualities above mentioned, the highly desirable advantage of being free from poisonous substances.

While I have given above an illustrative table of relative proportions of the several ingredients of the composition, it will be understood that variation of the stated proportions may be made within reasonable limits. For example, by increasing the relative proportion of potassium chlorate with proportionate decrease of magnesium oxide, the action of the firework will be speeded up, i. e. the combustion thereof accompanied by the detonations will be more rapid; while, on the other hand, by decreasing the relative proportion of potassium chlorate with proportionate increase of magnesium oxide, the action of the firework will be slowed down, i. e. the combustion thereof accompanied by the detonations will be slower. Changes in the balance of the other ingredients within reasonable limits may be also made while still attaining the purposes and function of the composition within the scope and spirit of this invention.

Having thus described my invention, I claim:—

1. A non-hygroscopic firework composition adapted to produce successive detonations when ignited, comprising at least one sulphur phosphorus compound as its active agent, at least one substance producing oxygen, and an inorganic binder consisting in magnesium oxide and an alum.

2. A non-hydroscopic firework composition adapted to produce successive detonations when ignited, comprising phosphorus sequisulphide as its active agent, at least one chlorate as the oxygen producing substance, and an inorganic binder consisting in magnesium oxide and an alum.

3. A non-hygroscopic firework composition adapted to produce successive detonations when ignited, comprising phosphorus sesquisulphide, potassium chlorate, an inorganic binder of magnesium oxide and chrome alum, and an inert filler material.

4. A non-hygroscopic firework composition adapted to produce successive detonations when ignited, comprising a mixture of the herein named ingredients in the approximate proportions as follows; potassium chlorate 35 parts, chromium potassium sulphate 10 parts, magnesium oxide 35 parts, and phosphorus sesquisulphide 12 parts.

5. A non-hygroscopic firework composition such as defined in claim 4 to the mixture of which has been added an inert filler.

6. A non-hygroscopic firework composition such as defined in claim 4 to the mixture of which has been added beach sand in amount approximating 8 parts.

In testimony that I claim the invention set forth above I have hereunto set my hand this 29th day of November, 1927.

WILLIAM F. GEHRIG.